US009233791B2

(12) United States Patent
Bushnell et al.

(10) Patent No.: US 9,233,791 B2
(45) Date of Patent: Jan. 12, 2016

(54) TEMPERATURE-CONTROLLED CARGO CONTAINER WITH AIR DISTRIBUTION

(75) Inventors: Peter R. Bushnell, Cazenovia, NY (US); Yu H. Chen, Manlius, NY (US); Mehmet N. Sarimurat, Fayetteville, NY (US)

(73) Assignee: CARRIER CORPORATION, Farmington, CT (US)

( * ) Notice: Subject to any disclaimer, the term of this patent is extended or adjusted under 35 U.S.C. 154(b) by 468 days.

(21) Appl. No.: 13/320,612

(22) PCT Filed: Jun. 8, 2010

(86) PCT No.: PCT/US2010/037750
§ 371 (c)(1),
(2), (4) Date: Nov. 15, 2011

(87) PCT Pub. No.: WO2010/147797
PCT Pub. Date: Dec. 23, 2010

(65) Prior Publication Data
US 2012/0073322 A1     Mar. 29, 2012

Related U.S. Application Data

(60) Provisional application No. 61/230,302, filed on Jul. 31, 2009, provisional application No. 61/218,649, filed on Jun. 19, 2009.

(51) Int. Cl.
*B65D 88/12* (2006.01)
*B65D 88/74* (2006.01)
(Continued)

(52) U.S. Cl.
CPC ............ *B65D 88/121* (2013.01); *B65D 88/745* (2013.01); *B65D 90/06* (2013.01); *B60H 1/00014* (2013.01); *F24F 7/10* (2013.01)

(58) Field of Classification Search
CPC ........ B60H 1/00014; B60H 1/26; B60H 1/34; F24F 7/10; F24F 2013/0608; B65D 88/74; B65D 88/741; B65D 88/742; B65D 88/744; B65D 88/745; B65D 88/747; B65D 88/748
USPC ............. 62/263, 371, 459.9, 259.2, 239, 407, 62/413, 414, 415, 418, 419; 454/77, 79, 454/88, 175, 177, 186, 90, 92, 108, 144, 454/289, 247
See application file for complete search history.

(56) References Cited

U.S. PATENT DOCUMENTS 1,835,085 A * 12/1931 Robson ........................ 454/79
2,260,503 A   10/1941 Zeidler
(Continued)

FOREIGN PATENT DOCUMENTS

DE        68917735 T2    12/1994
DE    202004013908 U1    10/2004
(Continued)

OTHER PUBLICATIONS

Singapore Written Opinion and Search Report for Singapore Patent Application No. 201109412-5 for International Application No. PCT/US2010/037750, Apr. 15, 2013, 17 pages.
(Continued)

*Primary Examiner* — M. Alexandra Elve
*Assistant Examiner* — John Higgins
(74) *Attorney, Agent, or Firm* — Cantor Colburn LLP (57) ABSTRACT

The distribution of condition air into the cargo space of a temperature controlled container is improved. Conditioned air may be selectively distributed into the cargo space from a plenum beneath the cargo support floor through a plurality of longitudinally and laterally spaced apart openings through the cargo support floor. Side air ducts may be provided extending rearwardly along the side walls of the container for distributing conditioned air received from a pair of side air outlets in a refrigerant unit associated with the container. The side air ducts may have a plurality of air discharge openings and may discharge conditioned air into vertically extending recesses in the side walls. The side air outlets have a selectively variable flow area. The number, location and size of the openings through the cargo support floor, as well as the air discharge openings in the side air ducts, may be selectively varied so as to selectively distribute the conditioned air flow throughout the cargo space.

13 Claims, 6 Drawing Sheets

(51) Int. Cl.
  *B65D 90/06* (2006.01)
  *B60H 1/00* (2006.01)
  *F24F 7/10* (2006.01)

(56) References Cited

U.S. PATENT DOCUMENTS

| | | | |
|---|---|---|---|
| 2,305,645 | A | 12/1942 | Sweeley et al. |
| 2,882,701 | A | 4/1959 | Nelson et al. |
| 2,923,384 | A | 2/1960 | Black |
| 3,246,592 | A | 4/1966 | Rath |
| 3,733,849 | A | 5/1973 | Cantagallo et al. |
| 3,981,083 | A | 9/1976 | Danford |
| 4,003,728 | A * | 1/1977 | Rath ................. 62/78 |
| 4,143,588 | A * | 3/1979 | Exler .............. 454/118 |
| 4,481,870 | A * | 11/1984 | Smith ............... 454/88 |
| 4,744,225 | A | 5/1988 | Shoji et al. |
| 4,800,733 | A | 1/1989 | Strobel et al. |
| 4,979,431 | A | 12/1990 | Fujimoto et al. |
| 5,809,798 | A | 9/1998 | Clarke et al. |
| 5,830,057 | A | 11/1998 | Hunt, Jr. |
| 5,946,933 | A | 9/1999 | Clarke et al. |
| 6,164,085 | A | 12/2000 | Clarke et al. |
| 6,431,060 | B1 | 8/2002 | Gutheim |
| 6,457,402 | B1 | 10/2002 | Parker et al. |
| 6,508,076 | B1 | 1/2003 | Gast et al. |
| 6,758,057 | B2 | 7/2004 | Vince, II et al. |
| 6,763,677 | B1 | 7/2004 | Burchill et al. |
| 6,923,111 | B2 | 8/2005 | Kiefer et al. |
| 7,260,946 | B2 | 8/2007 | Ludwig et al. |
| 7,266,961 | B2 | 9/2007 | Ludwig et al. |
| 2007/0095092 | A1 | 5/2007 | Wuerfel, III |
| 2008/0146137 | A1 | 6/2008 | Mosunic |

FOREIGN PATENT DOCUMENTS

| | | |
|---|---|---|
| EP | 0832826 | 4/1998 |
| EP | 1332986 | 8/2003 |
| WO | 0007907 A1 | 2/2000 |

OTHER PUBLICATIONS

International Preliminary Report on Patentability mailed Jan. 5, 2012.

International Search Report and Written Opinion mailed Jan. 19, 2011.

* cited by examiner

TEMPERATURE-CONTROLLED CARGO CONTAINER WITH AIR DISTRIBUTION

CROSS REFERENCE TO RELATED APPLICATION

This application claims priority to U.S. Provisional Patent Application Ser. No. 61/218,649 entitled "Temperature-Controlled Cargo Container with Air Distribution," filed on Jun. 19, 2009 and U.S. Provisional Patent Application Ser. No. 61/230,302 entitled "Temperature-Controlled Cargo Container with Air Distribution," filed on Jul. 31, 2009. The content of these applications are incorporated herein by reference in their entirety.

BACKGROUND OF THE INVENTION

This invention relates generally to a mobile temperature-controlled container for transporting perishable cargo and, more particularly, to distribution of temperature-controlled air through out the cargo space defined within the container.

Temperature-controlled containers are commonly used for shipping perishable cargo, such as fresh produce, seafood and the other foods that must be maintained during transit at a temperature within a specified temperature range. Containers of this type are typically designed to accommodate transport by land on trailers, by sea on container ships, by rail on flat-bed train cars and even by air in cargo planes. Such versatile containers are commonly referred to as intermodal containers.

In conventional industry practice, temperature controlled containers are equipped with a refrigeration unit that is secured to one wall of the container, typically the front wall of the container. The refrigeration unit includes a compressor, a compressor motor, and a condenser unit isolated from the cargo space, and an evaporator unit operatively associated with the cargo space defined within the container. The condenser unit includes a refrigerant heat rejection heat exchanger and a condenser fan that draws ambient outdoor air through the condenser heat exchanger and discharges that air back into the outdoor environment. The evaporator unit includes a refrigerant heat absorption heat exchanger and one or more, typically two, evaporator fans which draw return air from the cargo space defined within the container through the evaporator heat exchanger for temperature conditioning and delivers that conditioned supply air back into the cargo space defined within the container. Although the refrigeration unit is typically operated in cooling mode to reduced the temperature of the return air, the refrigeration unit may be equipped with an auxiliary air heating device for heating the return air when the container is in transit in a region having an environment wherein the ambient outdoor temperature is below the desired temperature range in which the cargo in transit must be maintained.

The cargo space of the transport cargo container constitutes the volume defined between the front wall, the rear wall, the opposed side walls, the floor and the ceiling of the container structure. The cargo is stacked within the cargo space, generally on pallets, disposed atop the floor of the container. In standard practice in the industry, the floor of the container is formed of a plurality of parallel, longitudinally extending T-bars supported. The T-bars are spaced apart laterally to form a series of longitudinally extending air passageways that are open to the cargo space above the floor. A portion of the temperature-controlled air discharging from the evaporator passes downwardly along the front wall of the container and into these passageways. As the air flows along the passageways towards the rear wall of the container, air passes from the longitudinally directed airflow upwardly into the cargo space. Additional conditioned air discharges downwardly out of side outlets to flow along the floor adjacent each of side wall toward the rear wall. As this air flows toward the rear wall of the container, most of the air passes upwardly along the bounding side wall of the container. The air that reaches the rear wall passes upwardly along the rear wall and is then drawn forwardly above the stacked cargo toward and into a return air inlet chamber extending along the upper portion of the front wall. The air that flows upwardly along the side walls and the air passing upwardly from the floor through the stacked cargo is entrained in the forwardly flowing air above the cargo space and drawn into the return air inlet chamber. Cargo containers having floors of this general construction are shown, for example, in U.S. Pat. Nos. 5,830,057; 6,923,111; and 7,266,961.

Cargo containers of this type typically have a length of approximately twenty or forty feet (about 6.12 to 12.2 meters) in length, a height of about nine and one-half feet (about 2.9 meters), and a width of about eight feet (about 2.44 meters). Consequently, delivering adequate conditioned air from the front of the container where the air discharges from the evaporator of the refrigeration unit to the rear of the container is problematic. Inherently, air flowing through the passageways defined by the T-bar floor tends to passes upwardly into the cargo space through the openings between adjacent T-bars disproportionately. That is, there is a natural tendency for more conditioned air to pass from the passageways upwardly into the cargo space at the forward end of the container with the upward flow of air getting progressively smaller as the air flow progresses from front to rear longitudinally along the length of the container. This maldistribution of conditioned air is further complicated when cargo is not relatively tightly stacked as more air will tend to pass through gaps between cargo stacks as these gaps represent a path of low resistance. While various techniques have been tried to increase the "throw" of the rearwardly flowing air so as to improve the reach of the conditioned air to the rearwardly stowed cargo, in conventional temperature-controlled cargo containers, providing adequate flow of conditioned air to the rearward regions of the container, including the upper corners of the cargo space near the rear wall of the container, remains problematic. In general, in conventional temperature-controlled containers having floors of conventional T-bar construction, the stowed cargo tends to be overcooled at the end of the cargo space adjacent the refrigeration unit and undercooled at the door end of the container.

SUMMARY OF THE INVENTION

A temperature-controlled container is provided having a box-like structure having a forward wall, a rear wall, a pair of opposed side walls, a ceiling and a floor, thereby defining a cargo space within the box-like structure. In one aspect of the invention, the floor comprises a subfloor extending longitudinally between a lowermost portion of the forward wall and a lowermost portion of the rear wall and extending transversely between a lowermost portion of each of the opposed side walls, a cargo support floor disposed above and in spaced relationship with the subfloor thereby forming a plenum therebetween, and a plurality of longitudinally and laterally spaced apart openings through the cargo support floor. Each opening establishes flow communication between said plenum and the cargo space above the cargo support floor. The plurality of openings may be arranged so as to selectively distribute flow from said plenum into the cargo space.

Each of the plurality of openings defines a flow area. In an embodiment, the plurality of openings may define flow areas of various sizes. In an embodiment, the flow areas of the plurality of openings are larger in a rearward region of the cargo support floor than in a forward region of the cargo support space. The flow area of the openings may become progressively larger in a longitudinal direction from a forward end of the cargo space to a rearward end of the cargo space.

A refrigeration unit may be secured to the forward wall of the container for conditioning air drawn from the cargo space and returned to the cargo space. The refrigeration unit may have side air outlet openings for directing a portion of the conditioned air leaving the evaporator downwardly to the floor and along the respective side walls bounding the cargo space. In an aspect of the invention, the flow area of each of the side air outlets on the refrigeration unit may be selectively adjusted to selectively increase or decrease the amount of conditioned air passing therethrough.

In an aspect, a temperature-controlled container is provided having a box-like structure having a forward wall, a rear wall, a pair of opposed side walls, a ceiling and a floor, thereby defining a cargo space within the box-like structure, and a refrigeration unit for providing conditioned air to the cargo space. The refrigeration unit is disposed near the forward wall and includes an evaporator for conditioning air and for circulating conditioned air within the cargo space, a first side air outlet on a first side of the refrigeration unit and a second side air outlet on a second side of the refrigeration unit. A first side air duct opens in flow communication with the first side air outlet and has a portion extending rearwardly along a first of the opposed side walls of the cargo space. A second side air duct opens in flow communication with the second side air outlet and has a portion extending rearwardly along a second of the opposed side walls of the cargo space. Each of the first side air duct and the second side air duct may include a plurality of air discharge holes disposed in the rearwardly extending portions thereof. The air discharge holes in each of said first side air duct and said second side air duct may be selectively disposed at longitudinally spaced intervals. Each of the discharge holes in the first side air duct and the second side air duct may have a selectively sized air flow area.

A plurality of vertically extending recesses may be provided in each side wall for directing conditioned air from the floor upwardly along the each side wall. A blocking member may be selectively positioned in at least one recess of the plurality of recesses for directing the conditioned air passing upwardly along the recess inwardly into the cargo space. In an embodiment, at least one of the plurality of air discharge holes disposed in the rearwardly extending portion of the first air duct discharges into a vertically extending recess in the first side wall for directing conditioned air from the first air duct upwardly along the first side wall, and at least one of the plurality of air discharge holes disposed in the rearwardly extending portion of the second air duct discharges into a vertically extending recess in the second side wall for directing conditioned air from the second air duct upwardly along the second side wall.

BRIEF DESCRIPTION OF THE DRAWINGS

For a further understanding of the disclosure, reference will be made to the following detailed description, which is to be read in connection with the accompanying drawings, wherein.

DETAILED DESCRIPTION OF THE INVENTION

Figure 1:
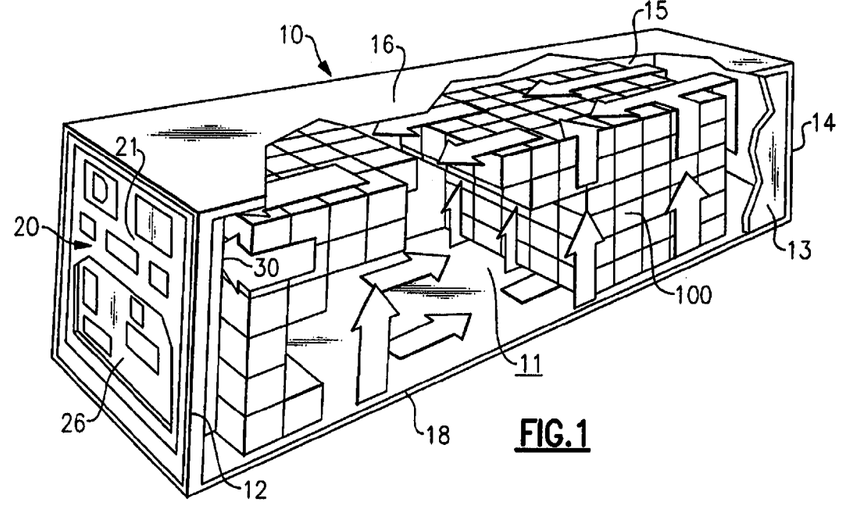
FIG. 1 is a perspective view of a mobile temperature-controlled cargo container embodying an aspect of the invention with a portion of the side wall and ceiling removed.
Figure 2:
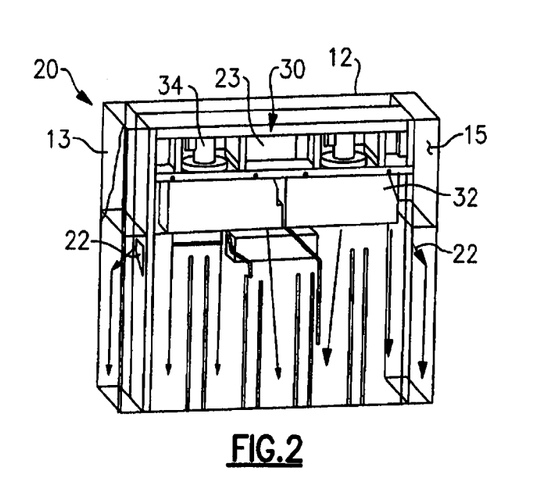
FIG. 2 is an elevation view of the evaporator face of the refrigeration unit mounted to the forward wall of the container of FIG. 1 looking forward from within the cargo space defined within the container.
Figure 3:
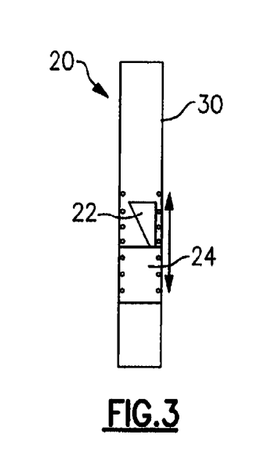
FIG. 3 is a side elevation view of the refrigeration unit depicted in FIG. 2.

Referring initially to FIGS. 1-3, there is illustrated an exemplary embodiment of a temperature-controlled refrigerated cargo container, generally referenced 10. The cargo container 10 has a box-like structure formed of a forward or front wall 12, a back or rear wall 14 spaced longitudinally from the forward wall 12, a pair of opposed sidewalls 13 and 15 that extend longitudinally between the forward wall 12 and the rear wall 14, a ceiling 16 that extends longitudinally between an upper region of the forward wall 12 and an upper region of the rear wall 14 and that extends transversely between upper regions of the respective opposed side walls 13, 15, and a floor 18 that extends longitudinally between a lowermost region of the forward wall 12 and a lowermost region of the rear wall 14 and that extend transversely between lowermost regions of the respective opposed side walls 13, 15. The box-like structure defines a cargo space 11 in which the bins, cartons or pallets of cargo 100 being transported are stacked on the floor 18. The rear wall 14 is provided with one or more doors (not shown) through which access to the cargo space may be had for loading the cargo 18 into the container 10. When the doors are closed, a substantially air-tight, sealed cargo space is established within the container 10 which prevents inside air from escaping the cargo space 11.

A refrigeration unit 20 is mounted to the forward wall 12 of the container 10 for conditioning the air within the cargo space 11 of the container 10. The refrigeration unit 20 includes a compressor (not shown), an associated compressor drive motor (not shown), and a condenser module (not shown) isolated from the cargo space 11, mounted in the lower section 26 of the refrigeration unit 20, and an evaporator module 30 operatively associated with the cargo space 11 defined within the container 10. The condenser module includes a refrigerant heat rejection heat exchanger (not shown) positioned behind the front panel 21, and one or more condenser fans (not shown) that draw ambient outdoor air through the condenser heat exchanger and discharge that air back into the outdoor environment. The evaporator module 30 includes a refrigerant heat absorption heat exchanger 32 and one or more, typically two, evaporator fan/fan motor assemblies 34 that draw return air from the cargo space 11 into a plenum 23 defined within the confines of the container 10 along an upper region of the forward wall 12 of the container 10. The evaporator fans 34 pass the return air, and any fresh outdoor air that may be mixed therewith in the plenum 23 as in conventional practice, downwardly through the evaporator heat exchanger 32 for temperature conditioning and delivers that conditioned air as supply air back into the cargo space 11 defined within the container 10. Although the refrigeration unit 20 is typically operated in cooling mode to reduce the temperature of the return air, the refrigeration unit 20 may be equipped with an auxiliary air heating device (not shown) for heating the return air when the container 10 is in transit in a region having an environment wherein the ambient outdoor temperature is below the desired temperature range in which the cargo in transit must be maintained.

Figure 4:
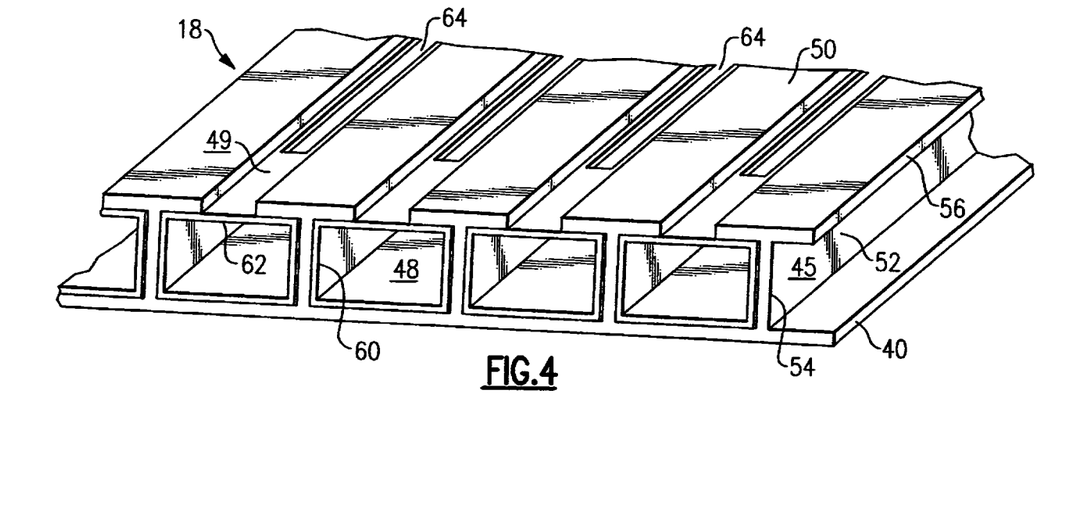
FIG. 4 is a perspective view of an exemplary embodiment of the floor of the container of FIG. 1.
Figure 7:
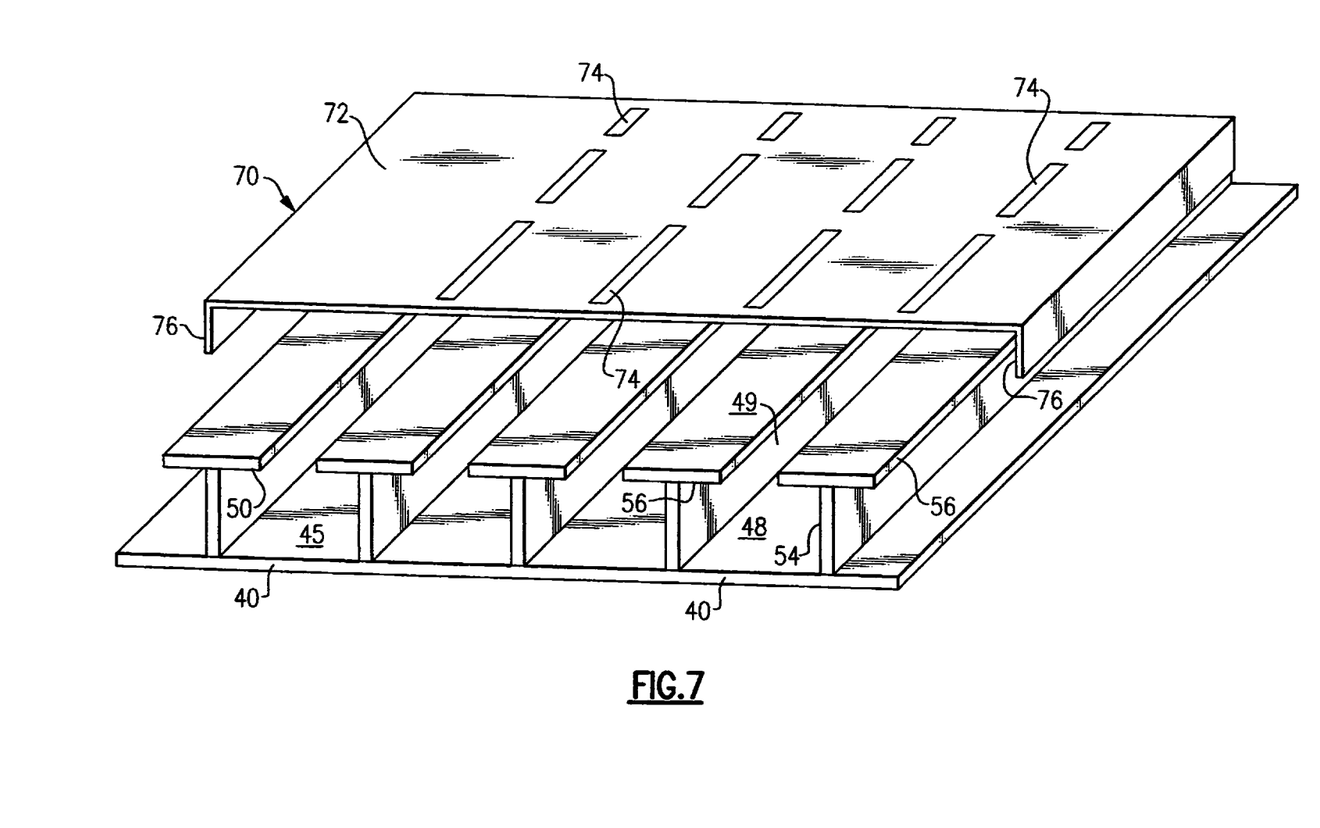
FIG. 7 is a perspective view of another exemplary embodiment of the floor of the container of FIG. 1.

Referring now to FIGS. 4 and 7, in particular, the floor 18 of the container 10 comprises a sub-floor 40 and a cargo support floor 50 disposed above and in spaced relationship with the sub-floor 40 thereby forming a floor plenum 45 therebetween. The sub-floor 40 extends longitudinally between a lowermost portion of the forward wall 12 and a lowermost portion of the rear wall 14 and extends transversely between a lowermost portion of each of the opposed side walls 13, 15. The cargo support floor 50 provides a surface on which the cargo 100 being transported, or bins, cartons or pallets of the cargo 100, are stacked, typically in parallel rows between the side walls 13, 15 of the container 10. The cargo support floor 50 comprises a plurality of T-rails 52 extending longitudinally from the forward wall 12 to the rear wall 14. Each T-rail 52 has a vertical member 54 and a horizontal member 56 disposed transversely atop the vertical member 54. The upper surfaces of the horizontal members 56 of the T-rails 52 collectively provide the cargo support surface of the floor 18.

The T-rails 52 are disposed on the floor sub-floor 40 with the vertical members 54 extending upwardly from the sub-floor 40. The T-rails 52 may be formed integrally with the sub-floor 40. The T-rails 52 are positioned in spaced relationship at laterally spaced intervals across the width of the cargo space 11 such that a plurality of ducts 48 are provided between respective vertical members 54 of adjacent T-rails 52. The ducts 48 form a series of longitudinally extending passageways through the floor plenum 45. A plurality of gaps 49 are formed between the horizontal members 56 of adjacent T-rails 52. Each gap 49 extends the length of the respective duct 48 formed therebeneath between the vertical members 54 of the respective T-rails 52 associated therewith. Each gap 49 provides an open passageway extending from the respective duct 45 therebeneath into the cargo space 11 the entire length of the T-rails 52.

A portion of the conditioned air discharging from the evaporator 30 passes downwardly along the forward wall 12 of the container 10 into the floor plenum 45 to flow through the various ducts 48 formed in the floor plenum 45. As the conditioned air traverses the longitudinally extending ducts 48 from the forward wall 12 toward the rear wall 14, a portion of that conditioned air will be drawn upwardly into the cargo space 11 through the gaps 49 to flow between the stacks of the cargo 100 stowed in the cargo space 11. Additionally, the remaining portion of the conditioned air discharging from the evaporator 30 passes out of the refrigeration unit 20 through a pair of side air outlets 22. One side air outlet 22 is provided in each of the left and right side panels of the refrigeration unit 20. The conditioned air passing through each side air outlet 22 flows downwardly along the respective side panels to the floor 18 and thence along the lower portion of the respective adjacent side wall towards the rear wall 14. In practice, as illustrated in FIG. 2, the refrigeration unit 20 does not span the entire width of the cargo space 11, but rather a substantial portion thereof, such as for example about 85% of the that width, whereby side chambers 25 are provided into which the conditioned air discharges through the respective side outlets 22. As will be explained in further detail hereinafter, as the conditioned air passes along the adjacent side wall, some of that conditioned air will be drawn upwardly through vertically extending recesses in the side wall to the top region of the side wall near the ceiling of the container. The general pattern of the flow of the conditioned air throughout the cargo space 11 of the container 10 is illustrated by the broad arrows in FIG. 1.

Figure 5:
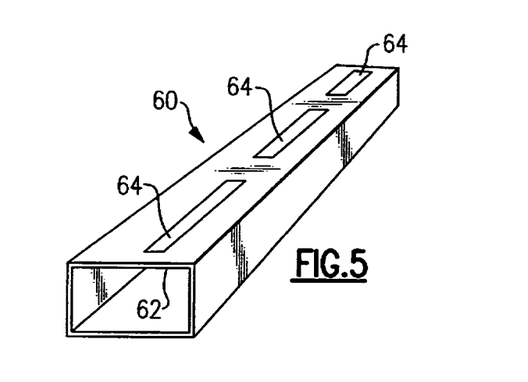
FIG. 5 is a perspective view of a longitudinally extending portion of an exemplary embodiment of an air distribution conduit of the floor of FIG. 4
Figure 6:
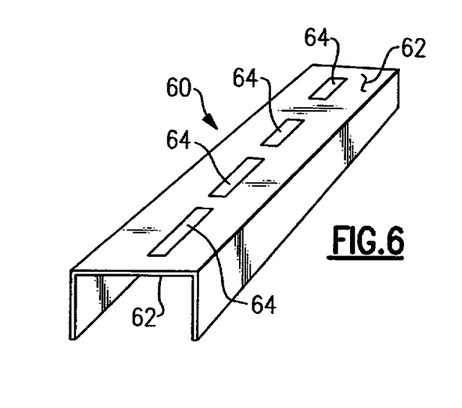
FIG. 6 is a perspective view of a longitudinally extending portion of another exemplary embodiment of an air distribution conduit of the floor of FIG. 4.

Referring now to FIGS. 4, 5 and 6, in particular, in the exemplary embodiment depicted therein, a longitudinally extending channel member 60 is disposed in each of the ducts 48 bounded by the vertical members 54 of adjacent T-rails 52, the lower surfaces of the horizontal members 54 of the adjacent T-rails 52, and the upper surface of the sub-floor 40. In the exemplary embodiment depicted in FIGS. 4 and 5, the channel members 60 have a rectangular box-like cross-section. However, the channel members 60 may have other cross-sections, such as for example, but not limited to, an inverted flatten-top U-shaped cross-section as illustrated in the exemplary embodiment depicted in FIG. 6.

The upper member 62 of each channel 60 has one or more openings 64 which when the channel 60 is positioned within a respective duct 48 align with the gap 49 thereabove. If a plurality of openings 64 are provided, the openings 64 are longitudinally spaced from one another along the longitudinal length of the upper member 62 of the channel 60. Each opening 64 may, for example, be in the shape of an elongated slot, as illustrated in the exemplary embodiment detected in FIGS. 4-7. However, it is to be understood that the openings 64 may be of other shapes, as desired.

When a channel 60 is positioned within a respective duct 48, the body of the upper member 62 blocks off the gap 49 from the flow communication with the respective duct 48 therebeneath except where the openings 64 are located. As noted previously, the openings 64 align with the gap 49 formed between the horizontal members 56 of the respective pair of adjacent T-rails 50, thereby providing a series of longitudinally spaced passages through conditioned air passing through the ducts 48 therebeneath may flow upwardly into the cargo space 11. Collectively, the openings 64 in the plurality of channels 60 disposed in the laterally spaced ducts 48 together form a grid of a plurality of longitudinally and laterally spaced air flow passages through which conditioned air may pass upwardly from the ducts 48 between the sub-floor 40 and the cargo support floor 50 and into the cargo space above the cargo support floor by way of the gaps 49.

Referring now to FIG. 7, in particular, in the exemplary embodiment depicted therein, no channels 60 are disposed within the ducts 48. Thus, each of the gaps 49 between the horizontal members 50 of adjacent pairs of T-rails 50 is open along its entire length to the respective duct therebeneath. However, a cover member 70 is disposed atop the cargo support floor 50. The cover member 70 has a plate-like member 72 that has longitudinal and lateral expanse and that, when the overlay member 70 is positioned atop a section of the floor 18, overlies the T-rails 50 located therebeneath, with the under surface of the plate-like member 72 lying upon the upper surface of the spanned T-rails 50. In the exemplary embodiment, as depicted in FIG. 7, the cover member 70 also has a pair of flanges 76, one of which extends longitudinally and downwardly along one lateral edge of the plate-like member 72 and the other of which extends longitudinally and downwardly along the opposite lateral edge of the plate-like member 72. Thus, when the cover member 70 is positioned atop a section of the cargo support floor 50, each of the side flanges 76 extends downwardly into a respective gap 49, which serves to maintain the cover member 70 in position during movement of the container 10 when in transit without cargo stacked upon the upper surface of the overlay member 70. In an embodiment, the cover member 70 may comprise a plate-like member 72 without side flanges, which is welded to or otherwise secured in position over the cargo support floor 50. The cover member 70 may be selectively sized such that the longitudinal and lateral expanse of the plate-like member 72 covers anywhere from a localized, small area of the cargo support floor 50 up to the entire surface of the cargo support floor 50, as desired.

With the cover member 70 positioned atop the T-rails 52, the plate-like member 72 blocks off the opening flow communication with the cargo space 11 from the ducts 48 through the gaps 49 lying beneath the plate-like member 72. However, a plurality of openings 74 may be provided in the plate-like member 72 at selective locations. In the depicted exemplary embodiment, the openings 74 are arrayed in a plurality of laterally spaced, longitudinally extending rows, with the rows aligned with the gaps 49 at selective locations to establish flow communication whereby a controlled amount of the conditioned air flowing longitudinally through the ducts 48 from the forward region to the rear region of the cargo space may pass upwardly from the ducts 48 through the openings 74 into the cargo space 11. In an embodiment, each opening 74 has the shape of a longitudinally elongated slot.

Referring again to FIGS. 4-7, the conditioned air passing through the ducts 48 between the vertical members 54 of the T-rails 52 forming the cargo support floor 50 may be selectively distributed throughout the cargo space 11 through variation of the number of openings 64, 74; variation in the flow area of the openings 64, 74; and through selective location of the openings 64, 74 over the length and width of the cargo support floor. Reducing the number of openings 64, 74 and/or the collective flow area of openings 64, 74 will result in a greater amount of the conditioned air flow discharging from the evaporator into the ducts 48 reaching the rear region of the cargo space 11 and passing upwardly along the rear wall 14 to the ceiling of the container 10. Conversely, increasing the number of openings 64, 74 and/or the collective flow area of openings 64, 74 will result in a lesser amount of the conditioned air flow discharging from the evaporator into the ducts 48 reaching the rear region of the cargo space 11 and more of that conditioned air flow passing upwardly to the ceiling of the container 10 through the openings 64, 74 selectively positioned longitudinally along the length of the cargo space 11 and laterally across the width of the cargo space 11. Through selective positioning of the openings 64, 74 longitudinally and laterally relative to the length and width, respectively, of the cargo space 11, the local distribution of the conditioned air may be adjusted to increase or decrease the local flow of conditioned air passing upwardly through the cargo stacked within the cargo space 11. In the depicted exemplary embodiments of the conduits 60 depicted in FIGS. 5 and 6 and of the planar member 72 depicted in FIG. 7, the flow areas of the plurality of openings 64, 74 becomes progressively larger in a longitudinal direction from a forward end of the cargo space 11 to a rearward end of the cargo space 11, thereby ensuring that adequate conditioned air is provided to cargo stowed in the rearward end of the cargo space 11 near the doors in the rear wall 14 and a lesser amount of conditioned air escapes into the cargo space 11 in the forward region of the cargo space 11 near the forward wall 12.

The conduits 60 illustrated in the exemplary embodiment depicted in FIGS. 4-6 and the overlay member 70 illustrated in the exemplary embodiment depicted in FIG. 7 may be installed in the floor 18 upon initial construction of the container 10 or may be retrofit in the field to the floor 18 of a pre-existing container 10. Further, those skilled in the art will recognize that the concept of providing a selective number of a plurality of openings of selective sizes at selective longitudinally spaced and laterally spaced locations along the length and across the width of the cargo space to provide passages for conditioned air to flow through the cargo support floor into the cargo space above the cargo support floor with the intent of more uniformly distributing that air flow throughout the cargo space may be integrated into floor constructions other than the T-rail type of floor construction depicted in the exemplary embodiments presented herein without departing from the spirit and scope of the invention.

Figure 8:
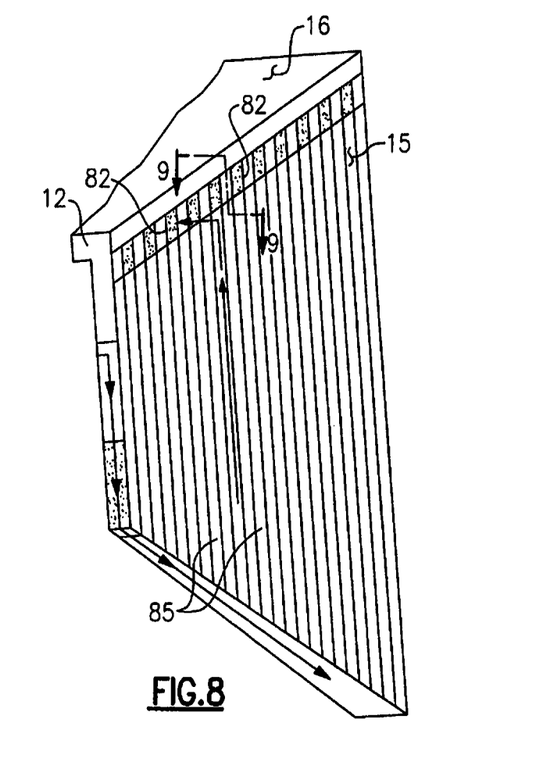
FIG. 8 is a perspective view of an exemplary embodiment of a side wall of the container of FIG. 1.
Figure 9:
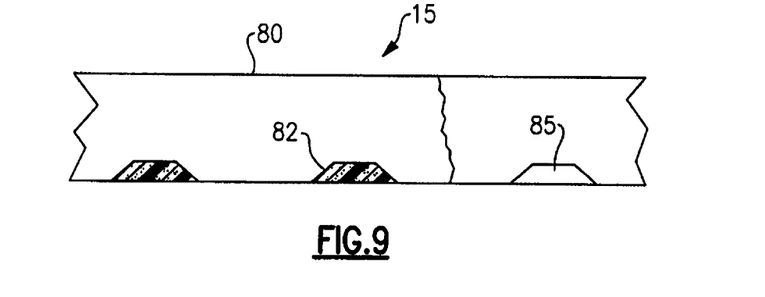
FIG. 9 is a sectioned plan view taken along line 9-9 of FIG. 8.

As noted previously, a portion of the conditioned air passing out of the evaporator 30 passes out of the refrigeration unit 20 through a pair of side air outlets 22, one being located in the left side panel and the other being located in the right side panel of the refrigeration unit 20. The conditioned air passing through each side air outlet 22 flows downwardly along the respective side panels to the floor 18 and thence along the lower portion of the respective adjacent side wall 13, 15 towards the rear wall 14. Referring now in particular to FIGS. 8 and 9, as the conditioned passes along the adjacent side wall (right side wall 15 depicted), some of that conditioned air will be drawn upwardly through vertically extending recesses 85 in the insulating foam panel 80, which forms part of the side wall, to the top region of the side wall near the ceiling 16 of the container 10. Blocking members 82, such as for example rubber gaskets, are inserted into the recesses 85 just under the cargo load line to block and redirect the conditioned air flowing up the recesses 85 to flow inwardly into the cargo space 11 and across the top of the cargo stacked therein. In conventional practice, with the recesses 85 being open to flow up to the ceiling 16, the conditioned air had a tendency to hug the ceiling as it was drawn back to the front of the cargo space 11 by the evaporator fans 34, rather the flowing in close proximity over the top of the stacked cargo. The blocking members 82 may be retrofitted in the field to the container side wall recesses 85 or fully integrated into the side wall recesses 85 during manufacture of the container 10.

Additionally, in an embodiment, the flow area of each side air outlet 22 may be selectively varied so as to increase or decrease the amount of flow of conditioned air along the respective side walls 13, 15 in relation to the amount of flow of conditioned air passing from the evaporator 40 into the cargo space 11 via the ducts 48 in the depicted embodiments. For example, in the exemplary embodiment depicted in FIGS. 1-3, the flow area of a side outlet 22 may be adjusted by movement, upwardly or downwardly, of a respective plate 24 associated with that side outlet 22. The plate 24 may be translated upwardly to cover a greater portion of opening of the side air outlet 22, thereby decreasing the flow area of the side outlet 22 and consequently the amount of conditioned air flowing through the side air outlet 22. Conversely, the plate 24 may be translated downwardly to uncover a greater portion, up to all, of the opening of the side air outlet 22, thereby increasing the flow area of the side outlet 22 and consequently the amount of conditioned air flowing through the side air outlet 22.

Figure 10:
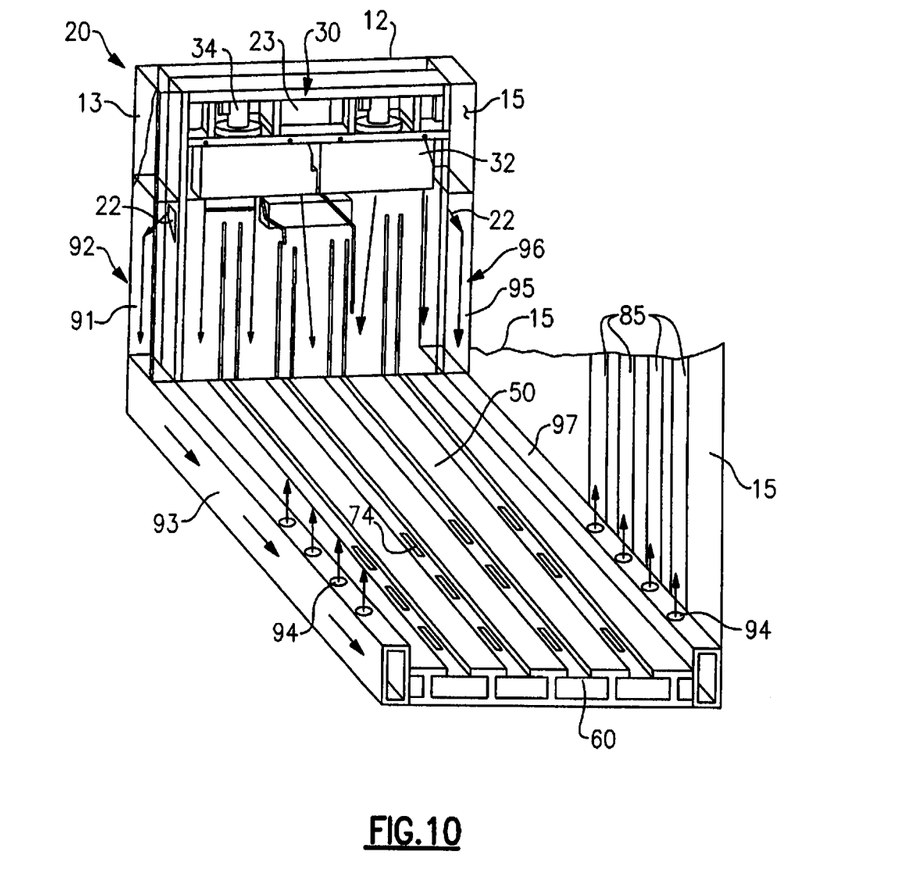
FIG. 10 is a perspective view of another embodiment of a mobile temperature-controlled cargo container with the ceiling, the left side wall and a portion of the right side wall removed and illustrating an embodiment of an air distribution system with side air ducts.
Figure 11:
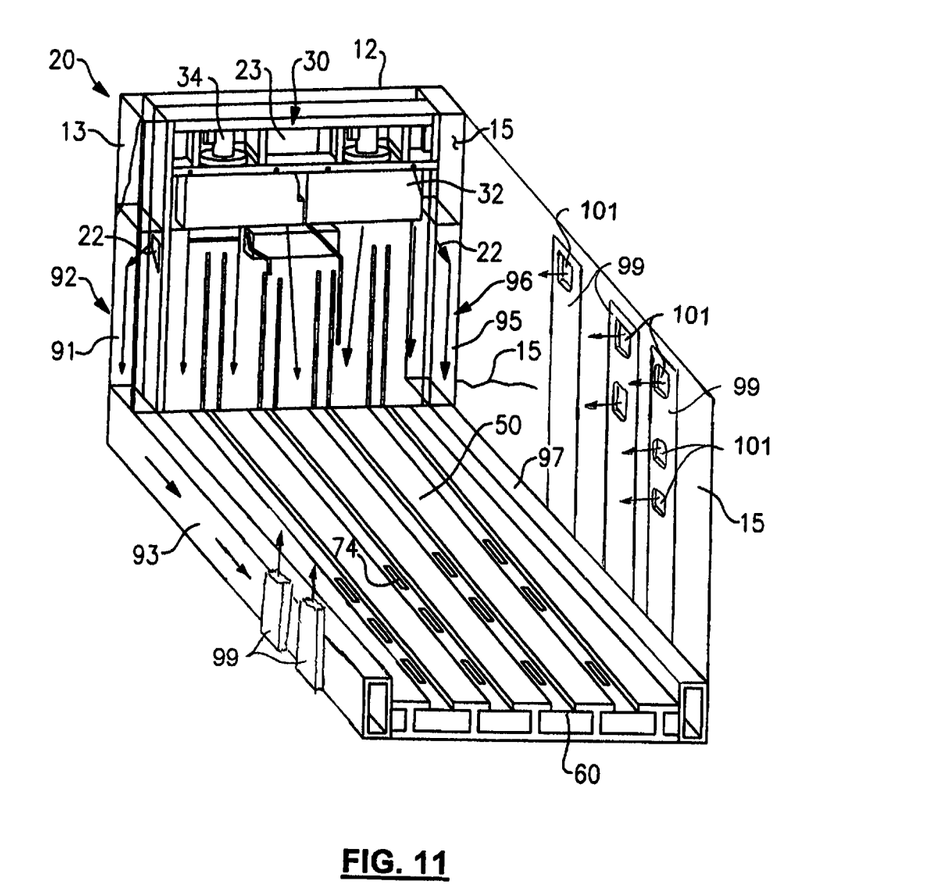
FIG. 11 is a perspective view of another embodiment of a mobile temperature-controlled cargo container with the ceiling and the left side wall removed and illustrating another embodiment of an air distribution system with side air ducts.

Referring now to FIGS. 10 and 11, in particular, in the embodiment depicted therein, the temperature controlled container 10 is provided with a pair of side air ducts 92, 96 for directing and selectively distributing the conditioned air discharging from the respective side air outlets 22 along the respective opposed side walls 13, 15 bounding the cargo space 11 of the container 10. The first side air duct 92 has a first leg 91 extending vertically along a first side of the refrigeration unit 20 and a second leg 93 extending horizontally and rearwardly along the first side wall 13 of the pair of opposed side walls. The second side air duct 96 has a first leg 95 extending vertically along a second side of the refrigeration unit 20 and a second leg 97 extending horizontally and rearwardly along the second side wall 15 of the pair of opposed side walls. Each of the first and second side air ducts 92, 96 has a plurality of discharge openings 94 in its respective second leg 93, 97.

Conditioned air discharged from the refrigeration unit 20 through the side air outlet 22 in the first side of the refrigeration unit 20 passes into the first leg 91 of the first side air duct 92 and flows downwardly into and thence rearwardly along the longitudinally extending flow passage defined by the second leg 93 of the first side air duct 92. Conditioned air passing through the longitudinally extending second leg 93 passes through the discharge openings 94 in the first side air duct 92 to flow upwardly along the side wall 13. Similarly, conditioned air discharged from the refrigeration unit 20 through the side air outlet 22 in the second side of the refrigeration unit 20 passes into the first leg 95 of the second side air duct 96 and flows downwardly into and thence rearwardly along the longitudinally extending flow passage defined by the second leg 97 of the second side air duct 96. Conditioned air passing through the longitudinally extending second leg 97 passes out of the discharge openings 94 in the second side air duct 96 to flow upwardly along the side wall 15.

The rearward end of each of the side air ducts 92, 96 may be closed off such that all of the conditioned air passing through the side air ducts exits through the discharge openings 94. Alternatively, the rearward end of each of the side air ducts 92, 96 may be open or partially open such that a portion of the conditioned air passing through the side air ducts 92, 96 exits therethrough near the rear wall 14 of the container 10 to flow upwardly through the side corner regions at the rear of the cargo space 11. The distribution of the conditioned air along the respective side walls 13, 15 may be controlled and modified by selectively varying one or more of: the respective outlet areas of the individual discharge openings 94, the number of discharge openings 94 provided, and the relative location of the individual discharge openings 94 along the longitudinal extent of the respective second legs 93, 97.

At least one, up to all, of the air discharge openings 94 in the side air ducts 92, 96 may be arranged in juxtaposition with a respective one of the vertically extending recesses 85 in the respective side walls 13, 15 so as to direct conditioned air upwardly along the respective side walls 13, 15 via the recesses 85 to an upper region of the cargo space. Alternatively, instead of letting the conditioned air passing out of the discharge openings 94 move upwardly along the respective side walls 13 and 15 along the recesses 85, one or both of the side air ducts 92, 96 may be provided with at least one third leg 99 that extends vertically upward along the side wall.

Referring now to FIG. 11 in particular, the first and second side air ducts 94, 96 have a plurality of third legs 99 extending vertically upwardly along the respective side walls 13, 15 of the container 10. Each of the third legs 99 comprises a vertically extending duct having an inlet in flow communication with the second leg 93, 97 of the respective side air ducts 94, 96. The ducts may extend up along their respective side wall to open through a discharge opening 101 near the upper end of the duct so as to discharge conditioned air to flow over the top of the stacked cargo 100. Additionally, each duct may be provided with another discharge opening 101 disposed at a selected location along its vertical extent or a plurality of discharge openings 101 disposed at vertically spaced selected locations along its vertical extent. The discharge openings 101 may be positioned at selected locations along the vertical extent of each duct so as to discharge conditioned air from the ducts 99 into the cargo space 11 at selected locations to cool "hot spots" within the cargo space 11. The number of ducts 99 provided and the placement of the ducts 99 along the respective second legs 93, 95 of the first and second side air ducts 92, 96, respectively, may be selectively varied in conjunction with selectively varying the number, size, shape and location of the openings 101 in the ducts 99, to obtain a desired distribution of conditioned air both longitudinally and vertically into the cargo space 11. Such control over the distribution of the conditioned air into the cargo space can be obtained through conventional air distribution systems.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

We claim:

1. A temperature-controlled container comprising a box-like structure having a forward wall, a rear wall, a pair of opposed side walls extending longitudinally between the forward wall and the rear wall, a ceiling extending longitudinally between the forward wall and the rear wall and extending transversely between the opposed side walls, and a floor extending longitudinally between the forward wall and the rear wall and extending transversely between the opposed side walls, and defining a cargo space within the box-like structure; said floor comprising:

a subfloor extending longitudinally between a lowermost portion of the forward wall and a lowermost portion of the rear wall and extending transversely between a lowermost portion of each of the opposed side walls;

a cargo support floor disposed above and in spaced relationship with the subfloor thereby forming a plenum there between; and a plurality of longitudinally and transversely spaced apart openings through the cargo support floor, each opening of said plurality of openings defining a flow area of a selected size and establishing flow communication between said plenum and the cargo space above the cargo support floor, said plurality of openings arranged so as to selectively distribute flow from said plenum into the cargo space;

wherein a refrigeration unit is secured to the forward wall of the container for conditioning air returned along the ceiling of the container and supplying conditioned air to said plenum for distribution to the cargo space through the openings, the refrigeration unit including a refrigeration unit plenum along an upper region of the forward wall and extending vertically to the cargo support floor to direct return air downward over an evaporator heat exchanger and into the plenum;

wherein the refrigeration unit includes a first side air outlet on a first side of the refrigeration unit and a second side air outlet on a second side of the refrigeration unit;

the temperature-controlled container including a first side air duct in flow communication with the first side air outlet and having a first leg extending vertically along the first side of the refrigeration unit and a second leg extending horizontally and rearwardly along the floor and along a first of the opposed side walls of the cargo space;

the temperature-controlled container including a second side air duct in flow communication with the second side air outlet and having a first leg extending vertically along the second side of the refrigeration unit and a second leg extending horizontally and rearwardly along the floor and along a second of the opposed side walls of the cargo space;

a plurality of vertically extending recesses in each side wall for directing conditioned air from the first side air duct and the second side air duct upwardly along the each side wall; and a blocking member selectively positioned in at least one recess of said plurality of recesses for directing the conditioned air passing upwardly along the recess inwardly into the cargo space.

2. The temperature-controlled container as recited in claim 1 wherein each of the plurality of openings defines a flow area of a selected size.

3. The temperature-controlled container as recited in claim 2 wherein the plurality of openings define flow areas of various sizes.

4. The temperature-controlled container as set forth in claim 2 wherein the respective flow areas of the plurality of openings in a rearward region of the cargo support floor generally are larger than the respective flow areas of the plurality of openings in a forward region of the cargo support floor.

5. The temperature-controlled container as recited in claim 2 wherein each of the plurality of longitudinally spaced opening defines a flow area, the respective flow areas of the openings becoming progressively larger in a longitudinal direction from a forward end of the cargo space to a rearward end of the cargo space.

6. The temperature-controlled as recited in claim 1 wherein:

the cargo support floor comprises a plurality of longitudinally elongated T-rails disposed on the sub-floor in spaced relationship laterally between the side walls bounding the cargo space and defining a cargo support floor disposed above and in spaced relationship with the subfloor thereby forming a plurality of longitudinally extending ducts between adjacent pairs of the T-rails and between the cargo support floor and the sub-floor.

7. The temperature-controlled container as recited in claim 6 wherein each T-rail of said plurality of T-rails include a vertical member and a horizontal member extending transversely atop the vertical member.

8. The temperature-controlled container as recited in claim 7 wherein the plurality of T-rails are spaced laterally apart such that a longitudinally extending gap is formed between the transversely extending horizontally members of adjacent pairs of T-rails, each gap being open below to a respective duct of said plurality of ducts.

9. The temperature-controlled container as recited in claim 6 further comprising at least one conduit-like member disposed in at least one of said plurality of ducts, the at least one conduit-member having an upper surface, the upper surface having at least one opening extending therethrough, said at least one opening defining a flow passage establishing flow communication between said at least one duct and the cargo space.

10. The temperature-controlled container as recited in claim 9 further wherein said at least one opening in the upper surface of said conduit-like member comprises a plurality of longitudinally spaced openings through the upper surface of the at least one conduit-member, each opening of said plurality of openings defining a flow passage having a flow area.

11. The temperature-controlled container as recited in claim 10 wherein the flow areas of the plurality of openings becomes progressively larger in a longitudinal direction from a forward end of the cargo space to a rearward end of the cargo space.

12. The temperature-controlled container as recited in claim 6 further comprising a cover member comprising a plate-like member having longitudinal and lateral expanse disposed atop the cargo support floor, said plate-like member having a plurality longitudinally elongated slots opening therethrough, the slots arrayed in a plurality of laterally space, longitudinally extending rows, each row of said plurality of longitudinally extending rows being aligned with a respective one of the plurality of gaps.

13. The temperature-controlled container as recited in claim 12 wherein each longitudinally extending row of slots includes a plurality of longitudinally spaced apart slots, each slot defining a flow passage having a flow area, the flow areas of the plurality of slots becoming progressively larger in a longitudinal direction from a forward end of the cargo space to a rearward end of the cargo space.

* * * * *